July 7, 1925.
W. C. DUFF
1,545,044
BELT FASTENER
Filed Aug. 6, 1923
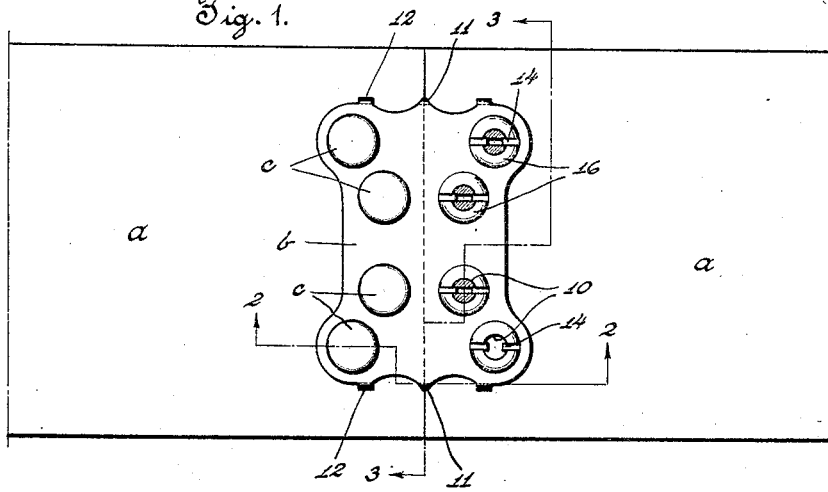
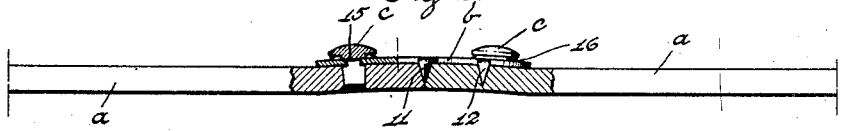
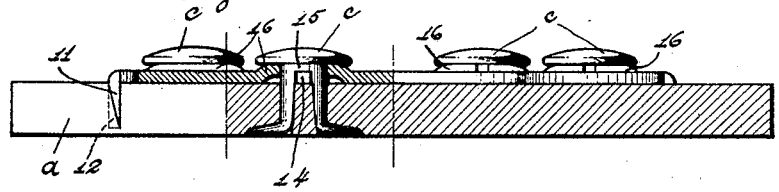
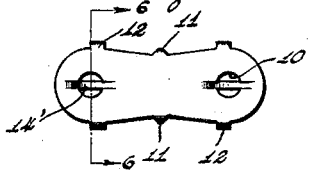
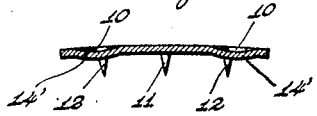
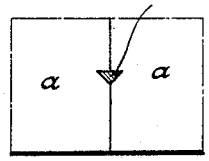
Inventor
William C. Duff.
By W. Clay Lindsey
His Attorney Patented July 7, 1925.

1,545,044

UNITED STATES PATENT OFFICE.

WILLIAM C. DUFF, OF UNIONVILLE, CONNECTICUT, ASSIGNOR TO THE BOURNE-FULLER COMPANY, OF CLEVELAND, OHIO, A CORPORATION OF OHIO.

BELT FASTENER.

Application filed August 6, 1923. Serial No. 655,941.

*To all whom it may concern:*

Be it known that I, WILLIAM C. DUFF, a citizen of the United States, and a resident of Unionville, county of Hartford, State of Connecticut, have invented certain new and useful Improvements in a Belt Fastener, of which the following is a specification.

This invention relates to belt fasteners of the type having a plate adapted to overlap the abutting ends of the belt, and split rivets extending through the plate and belt and having their legs clinched so as to secure the parts in place. Belt fasteners of this type are employed for securing together the ends of relatively heavy belts, such as thick rubber or web belts used for power transmission purposes.

The aim of the invention is to provide a belt fastener of this type having various features of novelty and advantage.

Another object of the invention is to provide a belt fastener which is very cheap and economical in construction, which is strong and sturdy, and which may be very quickly and readily secured in place.

A further object is to provide a belt fastener of the type described with means whereby it may be very quickly and accurately alined with respect to the ends of the belt to be secured together.

A further aim of the invention is to provide the plate with means for holding it in its alined position relative to the end or ends of the belt and against displacement preparatory to inserting the rivets.

A further object is to provide a very simple and effective arrangement at a practically negligible cost for insuring that the rivets are so inserted and secured in place to the belt that the slot between the legs of the rivets extend longitudinally of the belt and the legs of the rivets will be clinched transversely of the belt. The arrangement is such that the means for insuring that the rivets are properly positioned in the plate permits of sufficient stock at or adjacent the head of the rivets so that the latter is not weakened.

Other objects of the invention will be in part obvious and in part pointed out hereinafter in detail.

The invention accordingly consists in the features of construction, combination of elements and arrangement of parts which will be exemplified in the construction hereinafter set forth, and the scope of the application of which will be indicated in the appended claims.

In the accompanying drawing:

Figure 1 is a top plan view of the ends of a belt secured in abutting position by my improved belt fastener;

Fig. 2 is a longitudinal sectional view taken substantially on line 2—2 of Fig. 1;

Fig. 3 is a transverse view taken on line 3—3 of Fig. 1;

Fig. 4 is a top view of a plate showing another embodiment of the invention;

Fig. 5 is a longitudinal sectional view through the plate shown in Fig. 4;

Fig. 6 is a transverse view taken on line 6—6 of Fig. 4; and

Fig. 7 is a sectional view of one of the alining prongs and shows the manner in which this prong is embedded in the end edges of the belt.

Referring to the drawing in detail, and particularly to that embodiment shown in Figs. 1 to 3, $a$, $a$, denote the opposite ends of a belt secured together in abutting relation by the plate $b$ and the rivets $c$. The plate $b$, the size of which will depend upon the width and other characteristics of the belt, is provided with a plurality of openings 10 adapted to receive the rivets. The prongs or legs of the rivets are driven through the belt and then clinched or turned over, as most clearly shown in Fig. 3.

For the purpose of properly alining the plate relative to the ends of the belt, it has, at the central points of its end edges, downwardly turned integral prongs 11. The prongs preferably taper throughout their length to a sharp point and have sharp side edges so that they will cut into and become embedded in the abutting edges of the belt and not result in a space between the ends of the belt. For the purpose of holding the plate in proper alinement with the end edge of the belt while inserting and clinching the rivets, the plate is further provided with prongs 12 preferably formed integrally with the plate and turned down at right angles thereto so as to be embedded in the belt. These prongs are not relied upon to hold the plate to the belt when the belt is in service, but are provided as a means for temporarily holding the plate in place while inserting the rivets. The prongs 12 also come to a sharp point, and it will be seen that when the plate is hammered onto the belt, the material of the belt between the prongs 11 and 12 will be compressed or crowded together, making more effective the holding capabilities of the prongs. It is, of course, obvious that more than one plate may be employed for securing the adjacent ends of a belt together, particularly where the belt is of substantial width, and, in this instance, the prongs are of particular advantage in that they insure proper alinement of the plates relative to one another and relative to the ends of the belt.

For well known reasons, it is desired that the rivets be so applied that the slots between the legs of the rivets extend lengthwise of the belt and the prongs of the rivets are clinched transversely of the belt. In order to insure that the rivets are thus applied, the plate is provided with projections extending into the openings in such manner that the prongs of the rivets must straddle these projections. By preference, in order to effect economy in manufacture, the rivets are substantially round, and the holes, except for the projections, are also round. In the embodiment shown in Figs. 1 to 3, each hole is shown as provided with two projections 14 diametrically positioned and projecting into the hole in a direction lengthwise of the belt. In the embodiment shown in Fig. 4, the projections are shown as being in the form of bridges 14' extending from one side of the opening to the other. Also, by preference, the projections lie in a plane beneath the plane of the upper edges of the holes; that is to say, the projections are depressed. The advantage of this arrangement is that it is not necessary to split the rivets clear up to the head, but a solid stem or cylindrical piece of stock, as at 15, immediately beneath the head, may be had, thus materially strengthening the rivet. In the embodiment shown in Figs. 1 to 3, the plate about the holes is embossed or raised upwardly, as at 16, the advantage of this being that the projections may be depressed or sunk without being embedded into the belt. Also, the head of the rivet may be more easily gripped should it be desired to remove the same.

The embodiment shown in Figs. 4 to 6 is similar to the structure shown in the preceding figures, except that the plates are narrower, each plate having but a single opening at each end and the projections 14' extending entirely across the openings or holes. It is, of course, obvious that any desired number of holes may be provided in the plates, and the plates may be of any suitable size, depending on the duty to be imposed upon them. Also, the plates are preferably curved in a direction lengthwise of the belt in order that they will properly pass over pulleys.

From the foregoing description, it will be seen that the construction and arrangement of my belt fastener are extremely simple, and the parts may be very cheaply manufactured and readily assembled. The plate may be formed by stamping the same from a piece of sheet metal, and the rivets may be formed from cylindrical stock, the stock being cut up into suitable lengths, one end of each length being headed and the other end of each length being slotted to form the prongs. To apply the fastener to the ends of the belt, the points of the prongs 11 are brought into engagement with one end edge of the belt, and then the plate is forced down so as to embed the prongs 11 and one pair of prongs 12 into the belt. The prongs 11, as stated, insure that the plate is in proper position or alinement, and these prongs, together with the prongs 12, hold the plate against displacement during the operation of inserting and clinching the rivets. After one side or end of the plate is connected to one end of the belt, the other end of the belt is brought into engagement with the first end and the plate is forced down so as to embed the other pair of prongs into the second end of the belt. These prongs, together with the prongs 11, hold this end of the belt in proper relation to the first end and to the plate *b* when inserting the rivets. As previously stated, the side edges of the prongs 11 are sharp so that they cut into and embed themselves in the end edges of the belt permitting these end edges to be brought into close abutting relation. The rivets can be inserted in the openings only in one angular position, that is with the legs straddling the projection or projections 14. The heads of the rivets may be driven down into close engagement with the top of the plate while, at the same time, allowing sufficient stock at the crotch of the slot between the prongs to insure that the rivets are not weakened.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim as my invention:

1. A device of the character described for connecting adjacent ends of a belt comprising a plate having rivet holes, and rivets extending therethrough; said plate having at the medial portions of its side edges pointed prongs with sharp side edges adapted to embed themselves in the abutting ends of the belt without causing a space therebetween.

2. A device of the character described for connecting adjacent ends of a belt comprising a plate having rivet holes, and rivets extending therethrough; said plate having at the medial portions of its side edges prongs adapted to engage the end edges of the belt, said plate further having prongs spaced from the side edges and adapted to embed themselves in the belt, said prongs being so constructed and arranged as to compress that portion of the belt between said first prongs and said second prongs.

3. A device of the character described for connecting adjacent ends of a belt comprising a plate formed of sheet metal and having rivet holes, projections formed integral with said plate extending into said holes and depressed beneath the upper surface of the holes, and rivets in said holes having legs straddling said projections, each of said rivets having a solid cylindrical and unslotted stem between its head and legs.

4. A device of the character described for connecting adjacent ends of a belt comprising a plate having rivet openings and recesses about said openings on the under side of the plate, and projections formed integral with the plate extending into said openings and depressed into said recesses, and rivets positioned in said openings and having lugs straddling said projections, each of said rivets having a solid, cylindrical and unslotted stem between its head and legs.

5. A device of the character described for connecting adjacent ends of a belt comprising a plate having raised bosses provided with rivet openings and projections extending into said openings and spaced beneath the upper edge thereof, and rivets in said openings having prongs straddling said projections, each of said rivets having a solid, cylindrical and unslotted stem between its head and legs.

WILLIAM C. DUFF.